UNITED STATES PATENT OFFICE.

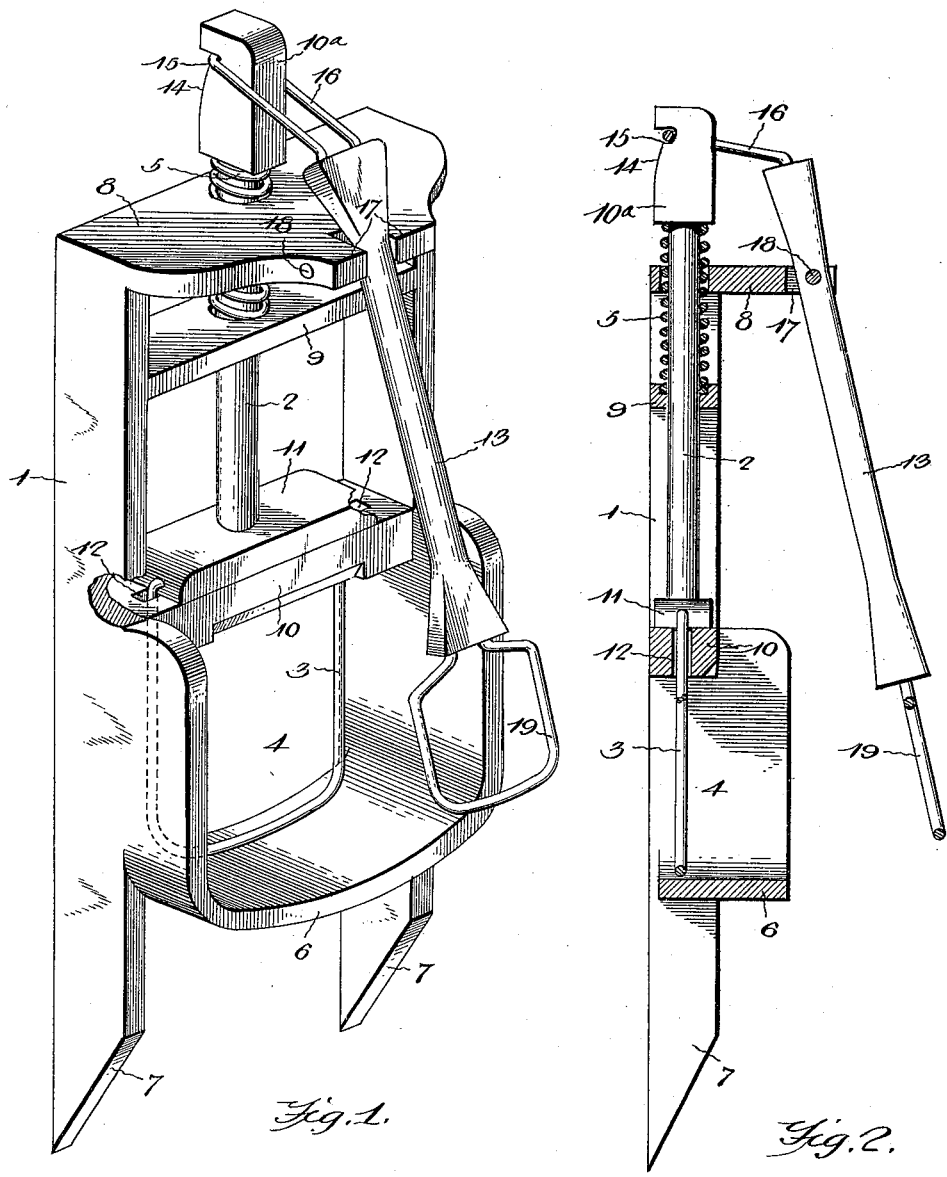

CARL O. HULBERG, OF LAKOTA, NORTH DAKOTA.

ANIMAL-TRAP.

SPECIFICATION forming part of Letters Patent No. 618,676, dated January 31, 1899.

Application filed March 25, 1898. Serial No. 675,133. (No model.)

*To all whom it may concern:*

Be it known that I, CARL O. HULBERG, a citizen of the United States, residing at Lakota, in the county of Nelson and State of North Dakota, have invented a new and useful Animal-Trap, of which the following is a specification.

The invention relates to improvements in animal-traps.

The object of the present invention is to improve the construction of animal-traps and to provide a simple, inexpensive, and durable one adapted to be quickly and easily set without liability of injuring the operator and capable of catching and instantly killing an animal.

The invention consists in the construction and novel combination and arrangement of parts, as hereinafter fully described, illustrated in the accompanying drawings, and pointed out in the claims hereto appended.

In the drawings, Figure 1 is a perspective view of an animal-trap constructed in accordance with this invention and showing the position of the parts when set. Fig. 2 is a vertical sectional view of the same.

Like numerals of reference designate corresponding parts in both figures of the drawings.

1 designates an oblong supporting-frame forming a guide for a vertical reciprocating spring-actuated plunger 2, which carries a bail or loop 3, arranged at or registering with an opening 4 of the frame 1 when the trap is set and adapted when the trap is sprung to engage the neck of an animal and choke it to death, the spring 5 being designed to have sufficient strength to kill an animal almost instantly with a minimum amount of pain and without messing the trap.

The sides of the frame are extended beyond the bottom connecting portion 6 and are tapered to form pointed projections or spurs 7, adapted to be embedded in the ground for supporting the trap in an upright position. The sides of the frame are braced above the bottom 6 by top and intermediate cross-pieces 8, 9, and 10. The cross-pieces 8 and 9 are provided with openings for the passage of the plunger 2, and the spring, which is of spiral form, is disposed on the plunger and has its lower end bearing against the cross-bar 9, preferably seated in a recess of the upper face thereof. The opening of the top cross-piece 8 is of sufficient size to permit the passage of the spring, which bears against a head or enlargement $10^a$ of the upper end of the plunger.

The body of the plunger is round, and a cross-piece 11, which is secured to the lower end of the same, operates in the space between the transverse bars 9 and 10 of the frame and carries the bail or loop 3, which extends through slots 12 of the cross-bar 10. The bail or loop is substantially U-shaped, its bottom portion being rounded and conforming to the configuration of the rounded or curved bottom 6 of the frame 1. The bottom and side walls of the opening 4 are extended beyond the sides of the frame, as clearly shown in the accompanying drawings, to increase the width of the walls of the opening 4, and thereby lengthen the passage-way in order to direct an animal passing through the opening and cause it to contact with a trigger 13 and spring the trap.

The upper end or head $10^a$ of the plunger is cut away at the front side to provide an inclined face 14 and to form a horizontal shoulder or seat 15 at the upper end of the incline to be engaged by a substantially U-shaped ring or eye 16, which encircles the plunger and holds the same depressed against the action of the spiral spring. The eye 16 is located at the upper end of the trigger, which is fulcrumed near its upper end in a recess formed by spaced projections or lugs 17, which are perforated for the reception of a pivot-pin 18.

The lower end of the trigger is provided with a loop or frame 19, substantially U-shaped, preferably formed integral with the body portion of the trigger and located in the path of an animal in position to be struck by the same, whereby it is swung outward to carry the upper end of the trigger out of engagement with the shoulder or seat of the plunger. By this construction the trap is rendered exceedingly sensitive, as it only requires a very slight pressure on the lower end of the trigger to spring the trap.

The trap is designed to be placed in front of the hole of a gopher or other burrowing animal; but it may be constructed on a larger scale and be arranged for catching various other animals, such as wolves, badgers, &c.

The invention has the following advantages: The trap, which is exceedingly simple and inexpensive in construction, possesses strength and durability and may be quickly and easily set without liability of injuring the operator. It is exceedingly sensitive and will be sprung by the slightest pressure on the lower portion of the trigger, and the lower portion of the latter, while being arranged in the path of an animal, does not obstruct the view through the opening 4 of the frame and deter an animal from entering the trap.

Changes in the form, proportion, and minor details of construction may be resorted to without departing from the spirit or sacrificing any of the advantages of this invention.

What I claim is—

1. An animal-trap comprising a supporting-frame having an opening, a spring-actuated plunger mounted on the frame and carrying a loop arranged to register with the opening of the frame when the trap is set and adapted to engage the neck of an animal, and a trigger fulcrumed between its ends on the frame and having one end engaging the plunger to hold the same in its set position, the other end of the trigger being located opposite the opening of the frame in the path of an animal, substantially as described.

2. An animal-trap comprising a supporting-frame having an opening, a spring-actuated plunger having a loop adapted to register with the opening and arranged to engage an animal, and a trigger engaging the plunger to hold the same in its set position, said trigger being disposed opposite the opening of the frame in the path of an animal and provided with an open portion or loop arranged to be engaged by the same, substantially as described.

3. An animal-trap comprising a supporting-frame, a spring-actuated plunger having a loop adapted to engage an animal, and a trigger pivoted between its ends on the frame and provided at one end with an eye or loop encircling and engaging the plunger, the other end of the trigger being arranged in the path of an animal, substantially as described.

4. An animal-trap comprising a supporting-frame provided with an opening, a spring-actuated plunger having a loop adapted to register with the opening, and a trigger pivoted between its ends, provided at one end with an eye to receive and engage the plunger, and having at its other end an open frame or loop arranged in the path of an animal and located opposite the said opening, substantially as described.

5. An animal-trap comprising a supporting-frame provided at its bottom with an opening and having pointed projections or spurs depending from the bottom and adapted to be embedded in the ground, a spring-actuated plunger mounted in the frame and provided with a loop adapted to register with the opening, and a trigger connected at one end with the plunger and having its other end arranged opposite the opening of the frame, substantially as described.

6. In an animal-trap, the combination of a frame comprising side pieces, a bottom piece connecting the side pieces, the transverse bar 10, located above the bottom piece to form an opening and provided with slots, the sides and bottom of the frame at the opening being extended to increase the walls thereof and lengthen the passage-way for an animal, and the cross-pieces 8 and 9 connecting the sides of the frame at the top of the trap, a plunger passing through openings of the cross-pieces 8 and 9, a spring for actuating the plunger, a loop carried by the plunger and passing through the slots of the bar 10, and a trigger connected with the plunger and disposed opposite the opening of the frame, substantially as described.

In testimony that I claim the foregoing as my own I have hereto affixed my signature in the presence of two witnesses.

CARL O. HULBERG.

Witnesses:
A. E. SHEETS,
A. J. GRONNE.